J. W. MYERS.
HEAT ACCUMULATOR FOR FIRELESS COOKERS.
APPLICATION FILED MAR. 7, 1910.

966,579. Patented Aug. 9, 1910.

UNITED STATES PATENT OFFICE.

JOHN W. MYERS, OF QUINCY, ILLINOIS.

HEAT-ACCUMULATOR FOR FIRELESS COOKERS.

966,579.   Specification of Letters Patent.   Patented Aug. 9, 1910.

Application filed March 7, 1910. Serial No. 547,791.

*To all whom it may concern:*

Be it known that I, JOHN W. MYERS, a citizen of the United States, residing at Quincy, county of Adams, and State of Illinois, have invented a certain new and useful Improvement in Heat-Accumulators for Fireless Cookers; and I do hereby declare the following to be a full, clear, and exact description of the same, reference being had to the accompanying drawings, forming a part of this specification, and to the figures and letters of reference marked thereon.

This invention relates to improvements in heat accumulators for fireless cookers, and has for its object to produce such a device that will retain the heat for a long period, and distribute the heat uniformly about the bottom of the vessel containing the food being cooked.

To these ends the invention consists in certain novel details of construction and combinations and arrangements of parts, all as will be now described and the particular features of novelty pointed out in the appended claim.

Figure 1:
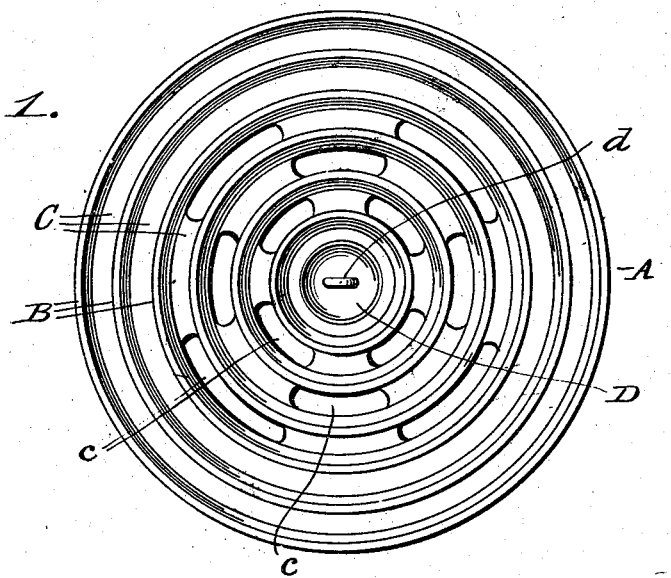
Figure 2:
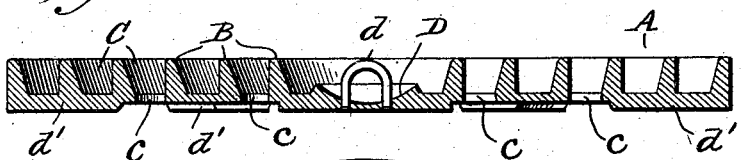
Figure 3:
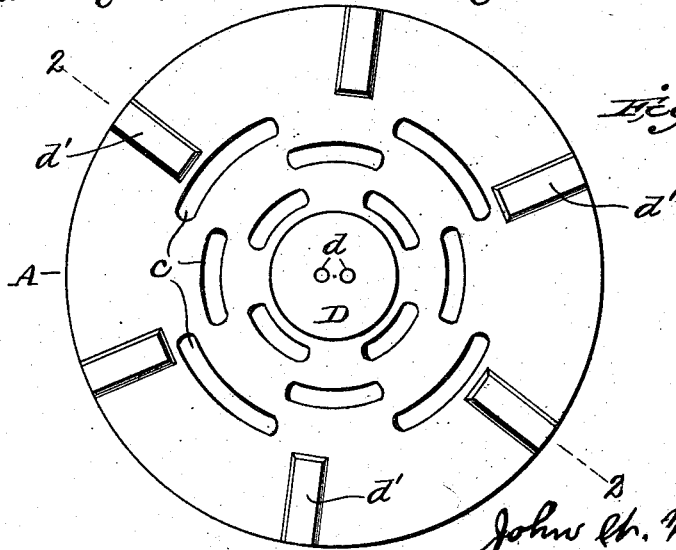

In the accompanying drawing, wherein I have illustrated the preferred construction—Figure 1 is a top plan view of an accumulator constructed according to the present invention. Fig. 2 is a cross sectional view. Fig. 3 is a bottom plan view.

Similar letters of reference in the several figures indicate the same parts.

The accumulator consists of a plate A, of any suitable metal of good heat conducting property, such as iron, and is of any desired shape to suit the cooker, that illustrated being shown as circular. Upon the upper surface of the plate A is formed a series of upwardly extending concentric flanges or ribs B, suitably spaced apart to form intermediate grooves or channels C, as shown clearly in the drawings. The two outermost grooves or channels C extend unbroken completely around the plate, while the remaining channels are preferably provided with elongated slots $c$, as shown clearly in Fig. 1, for a purpose to be hereinafter explained. The central portion D of the plate is provided with a ring or loop $d$, for the reception of a suitable instrument for handling the device. On the bottom of the plate D there are formed a number of lugs $d'$, preferably extending radially from the periphery thereof, whereby when the plate is placed within the cooker the plate will be raised slightly from the bottom thereof, as will be understood.

In the use of the device it is heated and then placed within the cooker and the receptacle containing the article to be cooked placed thereon. The two outermost channels extending unbrokenly throughout their length, when the receptacle is in place thereon, the heat will be packed or retained in these channels and will be distributed uniformly around the bottom of the receptacle so that the food stuff will be heated evenly.

By having the accumulator raised from the bottom of the cooker by means of the lugs $d'$, a space is left below the accumulator whereby a complete circulation is secured within the cooker, the steam drawn off from the receptacle becoming cool drops carrying with it the odors of the cooking, is drawn under the accumulator, and the moisture evaporated.

By having the elongated slots in some of the channels in the plate, when the plate is placed upon the stove for heating with the receptacle containing the food thereon, the flames will pass directly through these slots and impinge directly upon the bottom of the vessel, and thus hasten the preliminary or partial cooking of the food. The central solid portion of the plate will act as a spreader for the flame and direct it to the slots.

Having thus described my invention, what I claim as new and desire to secure by Letters Patent of the United States, is—

As a new article, a heat accumulator consisting of a metal plate, having a central solid portion, and a series of concentric ribs extending upwardly from its upper surface, suitably spaced apart to form intermediate grooves or channels, some of said channels extending unbrokenly throughout their length, while others are provided with elongated slots, and lugs upon the lower face of the plate.

JOHN W. MYERS.

Witnesses:
L. E. EMMONS,
L. E. EMMONS, Jr.